United States Patent
Mauro

(10) Patent No.: US 9,840,437 B2
(45) Date of Patent: Dec. 12, 2017

(54) HIGH STRENGTH ANTIMICROBIAL GLASS

(71) Applicant: Corning Incorporated, Corning, NY (US)

(72) Inventor: John Christopher Mauro, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 242 days.

(21) Appl. No.: 14/629,578

(22) Filed: Feb. 24, 2015

(65) Prior Publication Data
US 2015/0239777 A1    Aug. 27, 2015

Related U.S. Application Data

(60) Provisional application No. 61/944,656, filed on Feb. 26, 2014.

(51) Int. Cl.
| C03C 21/00 | (2006.01) |
| C03C 3/091 | (2006.01) |
| C03C 3/093 | (2006.01) |

(52) U.S. Cl.
CPC ............ *C03C 21/005* (2013.01); *C03C 3/093* (2013.01); *C03C 21/002* (2013.01); *C03C 2204/02* (2013.01); *Y10T 428/315* (2015.01)

(58) Field of Classification Search
None
See application file for complete search history.

(56) References Cited

U.S. PATENT DOCUMENTS

| 8,753,744 B2 * | 6/2014 | Borrelli ............... C03C 17/30 |
| | | 428/210 |
| 9,708,216 B2 * | 7/2017 | Bookbinder .......... C03C 21/005 |
| 2007/0172661 A1 | 7/2007 | Fechner et al. ............ 428/409 |
| 2009/0142568 A1 | 6/2009 | Dejneka et al. |
| 2009/0220761 A1 | 9/2009 | Dejneka et al. |
| 2012/0034435 A1 | 2/2012 | Borrelli et al. |
| 2012/0052271 A1 | 3/2012 | Gomez et al. |
| 2013/0017380 A1 * | 1/2013 | Murata ................. C03B 25/08 |
| | | 428/215 |

(Continued)

FOREIGN PATENT DOCUMENTS

| JP | WO 2014014003 A1 * | 1/2014 | ............ C03C 3/091 |
| WO | 2014194016 | 12/2014 | |

OTHER PUBLICATIONS

PCT/US2015/016238 Search Report dated Jul. 8, 2015.

*Primary Examiner* — David Sample
(74) *Attorney, Agent, or Firm* — Kevin M. Johnson

(57) ABSTRACT

A method of making a glass having antimicrobial properties and high compressive stress. The method includes a first ion exchange step in which potassium cations are exchanged for sodium cations in the base glass to provide a surface layer under compressive stress, followed by a second ion exchange in which silver cations are exchanged for potassium and lithium ions in the glass to produce the antimicrobial glass. In some embodiments, the antimicrobial glass has a maximum compressive stress that is at least 80% of the maximum compressive stress obtained by the potassium-for-sodium exchange in the first bath. A base glass and an ion exchanged glass antimicrobial having antimicrobial properties are also provided.

20 Claims, 2 Drawing Sheets

(56) References Cited

U.S. PATENT DOCUMENTS

2014/0356605 A1* 12/2014 Adib .................... C03C 21/001
                                                    428/220
2015/0246846 A1*  9/2015 Choju ................... C03C 3/091
                                                    428/34.4

* cited by examiner

HIGH STRENGTH ANTIMICROBIAL GLASS

This application claims the benefit of priority under 35 U.S.C. §119 of U.S. Provisional Application Ser. No. 61/944,656, filed on Feb. 26, 2014, the content of which is relied upon and incorporated herein by reference in its entirety.

BACKGROUND

The disclosure relates to glasses having antimicrobial properties. Even more particularly, the disclosure relates to damage resistant, chemically strengthened glasses having such antimicrobial properties.

High-strength glasses with anti-microbial surfaces are typically obtained through incorporation of silver, which is ion-exchanged into the glass via a molten salt (or aqueous) solution, into a surface region of the glass. However, the exchange of silver for potassium cations inevitably leads to a large drop in the compressive stress at the surface of the glass, causing is a significant loss of strength in the final glass product. This is because the ionic radius of silver (129 picometers (pm)) is much smaller than that of potassium (152 pm).

SUMMARY

As described herein, the problem of how to ion exchange silver into the glass surface without any significant loss of compressive stress is addressed by providing a method of making a glass having antimicrobial properties and high compressive stress. The method includes a first ion exchange step in which potassium cations are exchanged for sodium cations in the base glass to provide a surface layer under compressive stress, followed by a second ion exchange step in which silver cations are exchanged for potassium and lithium ions in the glass to produce the antimicrobial glass. In some embodiments, the antimicrobial glass has a maximum compressive stress that is at least 80% of the maximum compressive stress obtained by the potassium-for-sodium exchange in the first bath. A base glass and an ion exchanged glass antimicrobial having antimicrobial properties are also provided.

Accordingly, one aspect of the disclosure is to provide a glass comprising: at least about 50 mol % $SiO_2$; from about 5 mol % to about 25 mol % $Al_2O_3$; up to about 15 mol % $B_2O_3$; from about 10 mol % to about 25 mol % $Na_2O$; up to about 5 mol % $K_2O$; from 0.1 to about 2.5 mol % $Li_2O$; up to about 5 mol % $P_2O_5$; up to about 10 mol % $MgO$; up to about 10 mol % $CaO$; and up to about 10 mol % $ZnO$; and wherein 10 mol % $\leq Li_2O+Na_2O+K_2O \leq 30$ mol %.

A second aspect of the disclosure is to provide a glass comprising $SiO_2$, $Al_2O_3$, $Li_2O$, and $Na_2O$. The glass has a compressive layer extending from a surface of the glass to a depth of layer within the glass. The compressive layer comprises $K_2O$ and has a maximum compressive stress of at least about 700 MPa. The glass also comprises a first region within the compressive layer. The first region extends from the surface to a first depth that is less than the depth of layer and comprises from about 10 mol % to about 30 mol % $Ag_2O$, A third aspect of the disclosure is to provide a method of making an antimicrobial glass. The method comprises ion exchanging potassium cations from a first ion exchange bath for sodium cations in a glass comprising $SiO_2$, $Al_2O_3$, $Na_2O$, and $Li_2O$ to form a compressive layer extending from a surface of the glass to a depth of layer within the glass, and ion exchanging silver cations from a second ion exchange bath for lithium cations in a first region within the compressive layer, wherein the silver cations provide the glass with antimicrobial activity. The first region extends from the surface to a first depth within the glass, the first depth being less than the depth of layer.

These and other aspects, advantages, and salient features will become apparent from the following detailed description, the accompanying drawings, and the appended claims.

DETAILED DESCRIPTION

Figure 1:
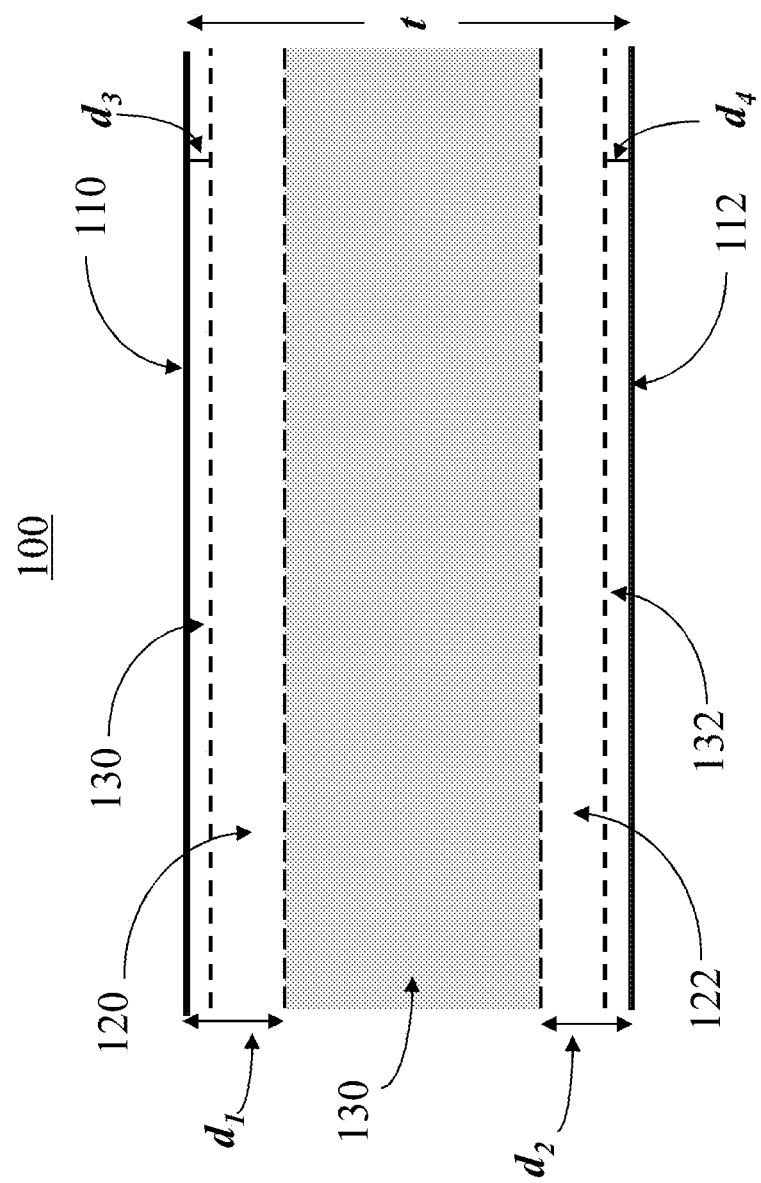
FIG. 1 is cross-sectional schematic view of an ion exchanged glass sheet.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of alkali metal oxides" or "substantially free of $P_2O_5$," is one in which such oxides are not actively added or batched into the glass, but may be present in very small amounts as contaminants.

Compressive stress and depth of layer of the ion exchanged glasses described herein are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses that are ion exchangeable and, when ion exchanged or otherwise chemically strengthened, exhibit high strength and antimicrobial properties. In some embodiments, the glass has a liquidus temperature of less than about 1100° C.

In one aspect, a "base" glass that may be later ion exchanged with silver is provided. In some embodiments, the base glasses described herein consist essentially of or comprise: at least about 50 mol % $SiO_2$ (i.e., $SiO_2 \geq 50$ mol %); from about 5 mol % to about 25 mol % $Al_2O_3$ (i.e., 5 mol % $\leq Al_2O_3 \leq 25$ mol %); up to about 15 mol % $B_2O_3$ (i.e., 0 mol % $\leq B_2O_3 \leq 15$ mol %); from about 10 mol % to about 25 mol % $Na_2O$ (i.e., 10 mol % $\leq Na_2O \leq 25$ mol %); up to about 5 mol % $K_2O$ (i.e., 0 mol % $\leq K_2O \leq 5$ mol %); from 0.1 mol % to about 2.5 mol % $Li_2O$ (i.e., 0 mol % $\leq Li_2O \leq 1.55$ mol %); up to about 5 mol % $P_2O_5$ (i.e., 0 mol % $\leq P_2O_5 \leq 10$ mol %); up to about 5 mol % MgO (i.e., 0 mol % $\leq$ MgO $\leq 5$ mol %); up to about 10 mol % CaO (i.e., 0 mol % $\leq$ CaO $\leq 10$ mol %); and up to about 10 mol % ZnO (i.e., 0 mol % $\leq$ ZnO $\leq 10$ mol %), wherein the sum of the alkali metal oxide modifiers is greater than or equal to 10 mol % and less than or equal to 30 mol % (i.e., 10 mol % $\leq Li_2O+Na_2O+K_2O \leq 30$ mol %). In some embodiments, 0 mol % $\leq$ MgO+CaO+ZnO $\leq 10$ mol %.

In particular embodiments, the base glasses described herein consist essentially of or comprise: from about 50 mol % to about 80 mol % $SiO_2$ (i.e., 50 mol % $\leq SiO_2 \leq 80$ mol %), from about 9 mol % to about 22 mol % $Al_2O_3$ (i.e., 9 mol % $\leq Al_2O_3 \leq 22$ mol %); from about 3 mol % to about 10 mol % $B_2O_3$ (i.e., 3 mol % $\leq B_2O_3 \leq 10$ mol %); from about 10 mol % to about 20 mol % $Na_2O$ (i.e., 10 mol % $\leq Na_2O \leq 20$ mol %); from 0.1 mol % to about 1.5 mol % $Li_2O$ (i.e., 0.1 mol % $\leq Li_2O \leq 1.5$ mol %); from 0 mol % to about 5 mol % $K_2O$ (i.e., 0 mol % $\leq K_2O \leq 5$ mol %); at least about 0.1 mol % MgO, ZnO, or combinations thereof, wherein 0 mol % $\leq$ MgO $\leq 6$ mol % and 0 mol % $\leq$ ZnO $\leq 6$ mol %; and, optionally, at least one of CaO, BaO, and SrO, wherein 0 mol % $\leq$ CaO+SrO+BaO $\leq 2$ mol %. Compositions of non-limiting examples of these glasses are listed in Table 1. Physical properties of these glasses are listed in Table 2.

TABLE 1

Exemplary compositions of glasses.

| mol % | 1 | 2 | 3 | 4 | 5 | 6 | 7 |
|---|---|---|---|---|---|---|---|
| $SiO_2$ | 67.44 | 66.18 | 64.39 | 62.54 | 63.30 | 65.20 | 66.93 |
| $Al_2O_3$ | 12.70 | 13.44 | 14.33 | 15.26 | 14.89 | 13.89 | 12.94 |
| $B_2O_3$ | 3.70 | 3.66 | 3.69 | 3.66 | 3.60 | 3.58 | 3.75 |
| $Na_2O$ | 13.59 | 13.50 | 13.48 | 13.48 | 12.87 | 11.83 | 10.87 |
| $K_2O$ | 0.00 | 0.01 | 0.01 | 0.02 | 0.02 | 0.02 | 0.02 |
| $Li_2O$ | 0.00 | 0.66 | 1.57 | 2.51 | 2.76 | 2.92 | 2.92 |
| MgO | 2.41 | 2.38 | 2.37 | 2.38 | 2.40 | 2.41 | 2.43 |
| CaO | 0.04 | 0.04 | 0.05 | 0.04 | 0.04 | 0.04 | 0.04 |
| $SnO_2$ | 0.09 | 0.09 | 0.09 | 0.09 | 0.09 | 0.09 | 0.09 |
| $ZrO_2$ | 0.01 | 0.01 | 0.01 | 0.01 | 0.01 | 0.01 | 0.01 |
| $Fe2O_3$ | 0.01 | 0.01 | 0.01 | 0.01 | 0.01 | 0.01 | 0.01 |
| Total | 100 | 100 | 100 | 100 | 100 | 100 | 100 |

TABLE 2

Physical properties of the glass compositions listed in Table 1.

| Sample # | 1 | 2 | 3 | 4 | 5 | 6 | 7 |
|---|---|---|---|---|---|---|---|
| Anneal Pt. (° C.) | 640 | 620 | 607 | 596 | 595 | 590 | 589 |
| Strain Pt. (° C.) | 585 | 566 | 557 | 547 | 545 | 541 | 539 |
| Softening Pt. (° C.) | 915.4 | 890.8 | 870.2 | 847.5 | 844.7 | 841.5 | 846.7 |
| Density (g/cm$^3$) | 2.402 | 2.41 | 2.419 | 2.428 | 2.424 | 2.415 | 2.406 |
| CTE (x10$^{-7}$/° C.) | 74.6 | 83.8 | 78.2 | 80.2 | 78.3 | 75.5 | 72.2 |
| Poisson's Ratio | 0.206 | 0.219 | 0.206 | 0.214 | 0.215 | 0.213 | 0.214 |
| Shear Modulus (Mpsi) | 4.15 | 4.245 | 4.342 | 4.415 | 4.451 | 4.432 | 4.447 |
| Young's Modulus (Mpsi) | 10.01 | 10.353 | 10.475 | 10.719 | 10.816 | 10.749 | 10.801 |
| 72-hr Air Liquidus Temp (° C.) | 1030 | 1010 | 1000 | 960 | 990 | 990 | 995 |
| 72-hr Int Liquidus Temp (° C.) | 1025 | 1005 | 995 | 950 | 990 | 990 | 990 |
| 72-hr Pt Liquidus Temp (° C.) | 1015 | 1000 | 990 | 950 | 980 | 975 | 980 |

In another aspect, an ion exchanged glass having antimicrobial properties is provided. The ion exchanged glass comprises $SiO_2$, $Al_2O_3$, $Li_2O$, and $Na_2O$ and has a compressive layer that extends from a surface of the glass to a depth of layer within the glass. The compressive layer comprises $K_2O$ and has a maximum compressive stress of at least about 700 MPa. A first region within the compressive layer extends from the surface of the glass to a first depth that is less than the depth of layer and comprises from about 10 mol % to about 30 mol % $Ag_2O$.

Ion exchange is widely used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. In the glasses described herein, for example, potassium ions from the cation source are exchanged for sodium ions within the glass during the first ion exchange step. The compressive layer extends from the surface to a depth of layer (DOL) within the glass.

The ion exchanged glass described herein is formed by first ion exchanging a base glass containing $SiO_2$, $Al_2O_3$, $Li_2O$, and $Na_2O$ in first ion exchange bath comprising at least one potassium salt. Potassium ions in the ion exchange bath replace sodium ions in the base glass to the depth of layer. Because the difference in radii of potassium and sodium (152 pm vs. 119 pm) cations is much smaller compared to the difference between potassium and lithium ionic radii (152 picometers (pm) vs. 90 pm), the initial ion exchange in the potassium-containing bath yields a preferential exchange of $K^+$ for $Na^+$. This first ion exchange provides the high surface compressive stress favorable for strength. In some embodiments, the at least one potassium salt includes potassium nitrate ($KNO_3$). Other potassium salts that may be used in the ion exchange process include, but are not limited to, potassium chloride (KCl), potassium sulfate ($K_2SO_4$), combinations thereof, and the like. The ion exchanged glass has at least one compressive layer extending from a surface of the glass to a depth of layer within the glass.

Following the potassium-for-sodium ion exchange, the glass is ion exchanged in a second ion exchange bath containing a silver solution, where both silver-for-potassium and silver-for-lithium ion exchange take place. In one non-limiting example, $Ag^+$-for-$Li^+$ and $Ag^+$-for-$K^+$ exchange is carried out in a $AgNO_3$-containing molten salt bath. The $Ag^+$-for-$Li^+$ exchange can occur much more readily due to the smaller difference in radii (129 pm vs. 90 pm) of the two cations. This leads to an increase in compressive stress that at least partially compensates for the loss in compressive stress due to $Ag^+$-for-$K^+$ exchange and, in some instances, there can be even a net increase in compressive stress as a result of the silver ion exchange.

The ion exchange of $Ag^+$-for-$Li^+$ and $Ag^+$-for-$K^+$ takes place in a first region within the compressive layer. As used herein, the term "compressive stress layer" refers to the layer or region under compressive stress, and the term "first region" shall be used to refer to the layer or region containing the antimicrobial silver species. This usage is for convenience only, and is not intended to provide a distinction between the terms "region" and "layer" in any way.

The first region extends from the surface to a first depth, which is less than the depth of the compressive layer. In some embodiments, the first region has an average thickness of up to about (i.e., less than or equal to) 20 μm and, in other embodiments, up to about 10 μm. Following ion exchange, the compressive layer has a maximum compressive stress of at least about 700 MPa.

A cross-sectional schematic view of a planar ion exchanged glass article is shown in FIG. 1. Glass article 100 has a thickness t, first surface 110, and second surface 112. While the embodiment shown in FIG. 1 depicts glass article 100 as a flat planar sheet or plate, glass article 100 may have other configurations, such as three dimensional shapes or non-planar configurations. Glass article 100 has a first compressive layer 120 extending from first surface 110 to a depth of layer $d_1$ into the bulk of the glass article 100. In the embodiment shown in FIG. 1, glass article 100 also has a second compressive layer 122 extending from second surface 112 to a second depth of layer $d_2$. Glass article also has a central region 130 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122. The ion exchange of $Ag^+$-for-$Li^+$ and $Ag^+$-for-$K^+$ takes place in first regions 130, 132 extend from surfaces 110, 112 to depths $d^3$, $d^4$, respectively in glass article 100, and provide an antimicrobial layer at the surfaces 110, 120 of glass article 100.

Essentially all of the silver that is introduced into the glass by ion exchange is located in the first regions 130, 132 of the glass. In some embodiments, the first regions 130, 132 comprise from about 10 mol % to about 30 mol % $Ag_2O$.

In some embodiments, the at least one compressive layer 120, 122 has a maximum compressive stress of at least about 700 MPa, in other embodiments, at least 750 MPa, in other embodiments, at least 800 MPa, and, in still other embodiments, at least about 850 MPa. As used herein, "maximum compressive stress" refers to the highest compressive stress value measured within the compressive layer. In some embodiments, the maximum compressive stress is located at the surface of the glass and may appear as a "spike" in the compressive stress profile. In other embodiments, the maximum compressive stress may occur at a depth below the surface, giving the compressive profile the appearance of a "buried peak." In some embodiments, the depths $d_1$, $d_2$ of first and second compressive layers 120, 122 are each at least about 30 μm, and, in other embodiments, at least about 40 μm.

Figure 2:
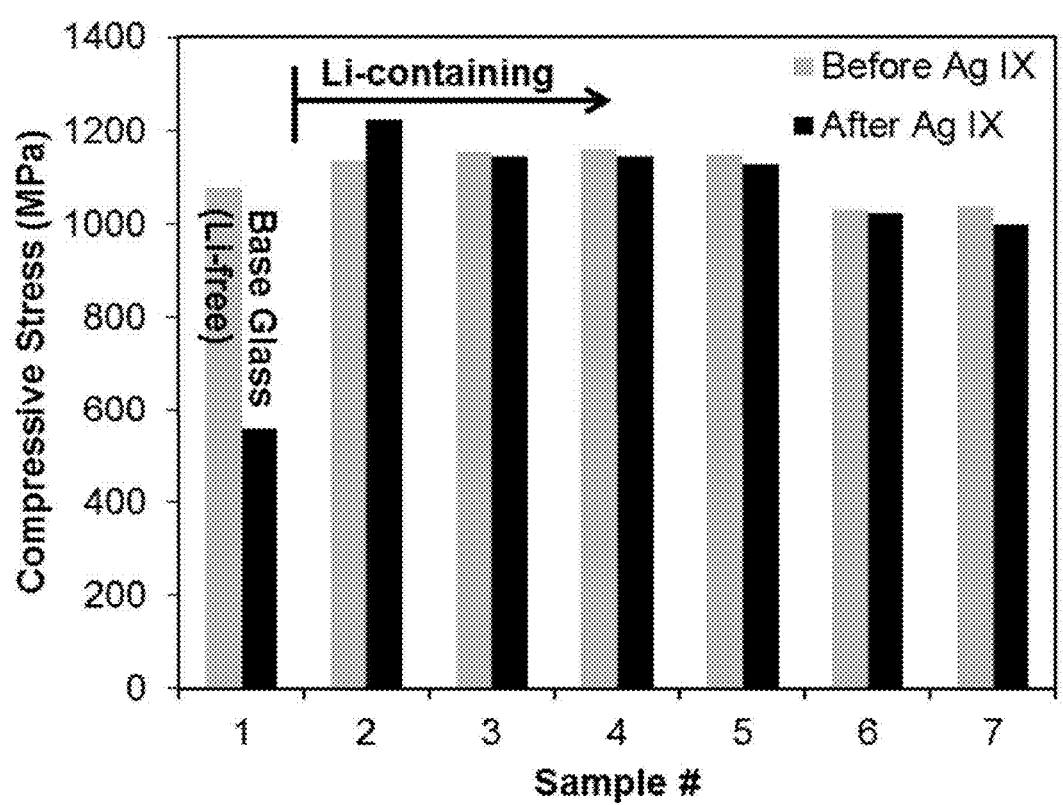
FIG. 2 is a plot of compressive stress in ion exchanged glass samples before and after $Ag^+$ ion exchange.

In some embodiments, the silver ion exchange results in no more than about a 20% reduction of the compressive stress resulting from the ion exchange in the potassium ion exchange bath. The advantage of incorporating $Li_2O$ into the base glass composition is illustrated in FIG. 2, in which compressive stress before and after $Ag^+$ion exchange is plotted for several glass samples. Sample 1 in FIG. 2 is a lithium-free base glass. For this sample, approximately half the surface compressive stress is lost after silver ion exchange. There is effectively no loss of compressive stress, however, when lithium is incorporated into the base glass composition (samples 2-7), and sample 2 exhibits an enhancement in compressive stress as a result of the $Ag^+$-for-$Li^+$ exchange.

The presence of silver in the glass provides the surface of the glass with antimicrobial properties; i.e., bacteria coming into contact with silver will be killed. In some embodiments, the ion exchanged antimicrobial glass described herein can exhibit at least a 5 log reduction in a concentration of at least *Staphylococcus aureus, Enterobacter aerogenes,* and *Pseudomomas aeruginosa* bacteri under JIS Z 2801 (2000) testing conditions. In other embodiments, the ion exchanged antimicrobial glass may also exhibit at least a 3 log reduction in a concentration of at least *Staphylococcus aureus, Enterobacter aerogenes,* and *Pseudomonas aeruginosa* bacteria under modified JIS Z 2801 (2000) testing conditions, wherein the modified conditions comprise heating the antimicrobial glass article to a temperature of about 23° C. to about 37° C. at a humidity of about 38% to about 42% for about 6 hours. The ion exchanged antimicrobial glass described herein may, in some embodiments, also exhibit ≤2 log reduction in a concentration of at least *Staphylococcus aureus*, *Enterobacter aerogenes*, and *Pseudomomas aeruginosa* bacteria under modified EPA testing conditions, wherein the modified conditions comprise heating the antimicrobial glass article to a temperature of about 23° C. at a humidity of about 38% to about 42% for about 2 hours.

In some embodiments, the ion exchanged antimicrobial glasses described hereinabove comprise: at least about 50 mol % $SiO_2$ (i.e., 50 mol %≤$SiO_2$≤80 mol %); from about 5 mol % to about 25 mol % $Al_2O_3$ (i.e., 5 mol %≤$Al_2O_3$≤25 mol %); up to about 15 mol % $B_2O_3$ (i.e., 0 mol %≤$B_2O_3$≤15 mol %); from about 10 mol % to about 25 mol % $Na_2O$ (i.e., 10 mol %≤$Na_2O$≤25 mol %); up to about 5 mol % $K_2O$ (i.e., 0 mol %≤$K_2O$≤5 mol %); up to about 1.5 mol % $Li_2O$ (i.e., 0 mol %≤$Li_2O$≤1.55 mol %); up to about 5 mol % $P_2O_5$ (i.e., 0 mol % $P_2O_5$≤10 mol %); up to about 5 mol % MgO (i.e., 0 mol %≤MgO≤5 mol %); up to about 10 mol % CaO (i.e., 0 mol %≤CaO≤10 mol %); and up to about 10 mol % ZnO (i.e., 0 mol %≤ZnO ≤10 mol %), wherein the sum of the alkali metal oxide modifiers is greater than or equal to 10 mol % and less than or equal to 30 mol % (i.e., 10 mol %≤$Li_2O$+$Na_2O$+$K_2O$≤30 mol %). In some embodiments, 0 mol %≤MgO+CaO+ZnO≤10 mol %.

In particular embodiments, the ion exchanged antimicrobial glasses described hereinabove comprise: from about 50 mol % to about 80 mol % $SiO_2$ (i.e., 50 mol %≤$SiO_2$≤80 mol %), from about 9 mol % to about 22 mol % $Al_2O_3$ (i.e., 9 mol %≤$Al_2O_3$≤22 mol %); from about 3 mol % to about 10 mol % $B_2O_3$ (i.e., 3 mol % $B_2O_3$≤10 mol %); from about 10 mol % to about 20 mol % $Na_2O$ (i.e., 10 mol %≤$Na_2O$≤20 mol %); from 0.1 mol % to about 1.5 mol % $Li_2O$ (i.e., 0.1 mol %≤$Li_2O$≤1.5 mol %); from 0 mol % to about 5 mol % $K_2O$ (i.e., 0 mol %≤$K_2O$≤5 mol %); at least about 0.1 mol % MgO, ZnO, or combinations thereof, wherein 0 mol %≤MgO≤6 mol % and 0 mol %≤ZnO≤6 mol %; and, optionally, at least one of CaO, BaO, and SrO, wherein 0 mol %≤CaO+SrO+BaO≤2 mol %.

Both the base glasses and ion exchanged antimicrobial glasses described hereinabove may further include at least one fining agent such as $SnO_2$, $As_2O_3$, $Sb_2O_5$, or the like. The at least one fining agent may, in some embodiments, include up to about 0.5 mol % $SnO_2$ (i.e., 0 mol % ≤$SnO_2$≤0.5 mol %); up to about 0.5 mol % $As_2O_3$ (i.e., 0 mol %≤$As_2O_3$≤0.5 mol %); and up to about 0.5 mol % $Sb_2O_3$ (i.e., 0 mol %≤$Sb_2O_3$≤0.5 mol %). In some embodiments, the glass may further include at least one colorant.

Each of the oxide components of the base and ion exchanged glasses described herein serves a function. Silica ($SiO_2$), for example, is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the glasses described herein comprise at least about 50 mol % $SiO_2$ and, in other embodiments, from about 50 mol % to about 80 mol % SiO2.

In addition to silica, the glasses described herein comprise the network formers $Al_2O_3$ and $B_2O_3$ to achieve stable glass formation, low CTE, low Young's modulus, low shear modulus, and to facilitate melting and forming. Like $SiO_2$, $Al_2O_3$ contributes to the rigidity to the glass network. Alumina can exist in the glass in either fourfold or fivefold coordination. In some embodiments, the glasses described herein comprise from about 5 mol % to about 25 mol % $Al_2O_3$ and, in particular embodiments, from about 9 mol % to about 22 mol % mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network. Threefold coordinated $B_2O_3$ is the most effective oxide for reducing the Young's modulus and shear modulus, thus improving the intrinsic damage resistance of the glass. Accordingly, the glasses described herein, in some embodiments, comprise up to about 15 mol % $B_2O_3$ and, in other embodiments, from about 3 mol % to about 10 mol % $B_2O_3$.

The alkali oxides $Li_2O$, $Na_2O$, and $K_2O$ are used to achieve chemical strengthening of the glass by ion exchange. Incorporation of $Li_2O$ into the base glass composition can lead to a final ion exchanged product having both high compressive stress and anti-microbial properties. The reason for this relates to the relative ionic radii of the monovalent ions of interest: $Li^+$ has a radius of 90 picometers (pm); the radius of $Na^+$ is 116 pm; the radius of $Ag^+$ is 129 pm; and $K^+$ has a radius of 152 pm.

The glasses described herein include $Na_2O$, which can be exchanged for potassium in a salt bath containing, for example, $KNO_3$. In some embodiments, 10 mol %≤$Na_2O$≤21 mol %, in other embodiments, 10 mol % to about 20 mol %. The glasses further comprise $Li_2O$ and, optionally, $K_2O$. As described herein, $Li^+$ cations in the glass may be exchanged for $Ag^+$ cations in an ion exchange bath. The exchange of Ag+ cations for Li+ cations in the glass helps offset the reduction in compressive stress resulting from the exchange of the larger K+ cations in the glass for smaller Ag+ cations. In some embodiments, 0.1 mol %≤$Li_2O$≤2.5 mol %, and, in certain embodiments, 0.1 mol %≤$Li_2O$≤1.5 mol %. Potassium cations in the glass also undergo ion exchange with silver cations. The glass comprises up to about 5 mol %, $K_2O$; i.e., 0 mol %≤$K_2O$≤5 mol %.

Phosphorous pentoxide ($P_2O_5$) is a network former incorporated in these glasses. $P_2O_5$ adopts a quasi-tetrahedral structure in the glass network; i.e., it is coordinated with four oxygen atoms, but only three of which are connected to the rest of the network. The fourth oxygen is a terminal oxygen that is doubly bound to the phosphorous cation. Association of boron with phosphorus in the glass network can lead to a mutual stabilization of these network formers in tetrahedral configurations, as with $SiO_2$. Like $B_2O_3$, the incorporation of $P_2O_5$ in the glass network is highly effective at reducing Young's modulus and shear modulus. In some embodiments, the glasses described herein comprise up to about 5 mol % $P_2O_5$; i.e., 0 mol %≤$P_2O_5$≤5 mol %.

Like $B_2O_3$, alkaline earth oxides such as MgO and CaO, and other divalent oxides such as ZnO, also improve the melting behavior of the glass. In some embodiments, the glasses described herein comprise up to about 10 mol % MgO, up to about 10 mol % CaO, and/or up to about 10 mol % ZnO and, in other embodiments, at least about 0.1 mol % MgO, ZnO, or combinations thereof, wherein 0≤MgO≤6 mol % and 0≤ZnO≤6 mol %. In some embodiments, the glass may also comprise at least one of the alkaline earth oxides, wherein 0 mol %≤CaO+SrO+BaO≤2 mol %.

In certain embodiments, silver is introduced into the glass by ion exchange, and serves as an antimicrobial agent. As such, $Ag_2O$ is concentrated in the first region 130, 132 of compressive layer or layers 120, 122 of the ion exchanged glass. In one embodiment, the glasses described herein may comprise up to about 30 mol % $Ag_2O$ and, in other embodiments, 10 mol % $\leq Ag_2O \leq$ 30 mol %.

The glass may also include at least one fining agent such as $SnO_2$, $As_2O_3$, $Sb_2O_5$, or the like in small concentrations to aid in the elimination of gaseous inclusions during melting. In some embodiments, the glass may comprise up to about 0.5 mol % $SnO_2$, up to about 0.5 mol % $As_2O_3$, and/or up to about 0.5 mol % $Sb_2O_3$.

In some embodiments, the base glasses described herein are formable by down-draw processes that are known in the art, such as slot-draw and fusion-draw processes. The base glass compositions containing small concentrations of $Li_2O$ are fully compatible with the fusion-draw process and can be manufactured without issue. The lithium can be batched as either spodumene or lithium carbonate.

The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 100 kilopoise (kpoise), in other embodiments, at least about 120 kpoise, and in still other embodiments, these glasses have a liquidus viscosity of at least about 300 kpoise.

In another aspect, a method of making the ion exchanged, antimicrobial glasses described hereinabove is also provided. In a first step, potassium cations in a first ion exchange bath are ion exchanged for sodium cations in a base glass comprising $SiO_2$, $Al_2O_3$, $Na_2O$, and $Li_2O$. In some embodiments, the base glass is one of those described hereinabove. The ion exchange of potassium cations for sodium cations forms a compressive layer extending from a surface of the glass to a depth of layer within the glass. The compressive layer is under a first maximum compressive stress following ion exchange in the first bath.

The first ion exchange bath, in some embodiments, is a molten salt bath comprising at least one potassium salt such as, but not limited to, potassium nitrate ($KNO_3$), potassium chloride (KCl), potassium sulfate ($K_2SO_4$), or the like. In some embodiments, the at least one potassium salt comprises or accounts for at least about 90 wt % of the first ion exchange bath; in other embodiments, at least about 95 wt % of the first ion exchange bath; and, in still other embodiments, at least about 98 wt % of the first ion exchange bath.

In a second step, silver cations in a second ion exchange bath are exchanged for potassium and lithium ions within the compressive layer resulting from the first ion exchange. The silver cations provide the glass with antimicrobial activity. The second ion exchange bath, in some embodiments, is a molten salt bath comprising at least one silver salt such as, but not limited to, silver nitrate ($AgNO_3$), silver chloride (AgCl), silver sulfate ($Ag_2SO_4$), or the like. In some embodiments, the at least one silver salt comprises at least about 5 wt % of the second ion exchange bath; in other embodiments, at least about 10 wt % of the second ion exchange bath; and, in still other embodiments, at least about 20 wt % of the second ion exchange bath.

After ion exchanging silver cations for potassium and lithium cations, the compressive layer has a second maximum compressive stress which, in some embodiments, is at least 80% of the first maximum compressive stress and, in other embodiments, at least 90% of the first maximum compressive stress. In some embodiments, the second maximum compressive stress is greater than or equal to the first maximum compressive stress. In certain embodiments, the second maximum compressive stress is at least about 700 MPa, in other embodiments, at least 750 MPa, in other embodiments, at least 800 MPa, and, in still other embodiments, at least about 850 MPa.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass, the glass comprising: from about 50 mol % to about 80 mol % $SiO_2$; from about 5 mol % to about 25 mol % $Al_2O_3$; up to about 15 mol % $B_2O_3$; from about 10 mol % to about 25 mol % $Na_2O$; up to about 5 mol % $K_2O$; from 0.1 mol % to about 2.5 mol % $Li_2O$; up to about 5 mol % $P_2O_5$; up to about 10 mol % MgO; up to about 10 mol % CaO; and up to about 10 mol % ZnO; and wherein 10 mol % $\leq Li_2O+Na_2O+K_2O \leq$ 30 mol %, wherein the glass is ion exchanged and has a compressive layer extending from a surface of the glass to a depth of layer within the glass, and wherein the compressive layer includes a first region extending from the surface to a first depth that is less than the depth of layer, the first region comprising $Ag_2O$.

2. The glass of claim 1, wherein the glass has a liquidus temperature of less than about 1100° C.

3. The glass of claim 1 wherein the first region comprises from about 10 mol % to about 30 mol % $Ag_2O$.

4. The glass of claim 1, wherein the first depth is greater than 0 μm and less than or equal to about 20 μm.

5. The glass of claim 1, wherein the compressive layer has a maximum compressive stress of at least about 700 MPa.

6. The glass of claim 1, wherein the glass has a kill rate of at least a 3 log reduction in a concentration of at least *Staphylococcus aureus, Enterobacter aerogenes*, and *Pseudomomas aeruginosa* bacteria under modified JIS Z2801(2000) testing conditions, wherein the modified conditions comprise heating the antimicrobial glass article to a temperature of about 23 degrees Celsius to about 37degrees Celsius at a humidity of about 38 percent to about 42 percent for about 24 hours followed by drying for about 6 hours to about 24 hours.

7. The glass of claim 1, wherein the glass further comprises at least one fining agent.

8. The glass of claim 7, wherein the fining agent comprises at least one of $SnO_2$, $As_2O_3$, and $Sb_2O_3$.

9. The glass of claim 7, wherein the at least one fining agent comprises at least one of 0 mol % to about 0.5 mol % $SnO_2$, 0 mol % to about 0.5 mol % $As_2O_3$, and 0 mol % to about 0.5 mol % $Sb_2O_3$.

10. The glass of claim 1, wherein the glass comprises: from about 50 mol % to about 80 mol % $SiO_2$, from about 9 mol % to about 22 mol % $Al_2O_3$; from about 3 mol % to about 10 mol % $B_2O_3$; from about 10 mol % to about 20 mol % $Na_2O$; from 0.1 mol % to about 1.5 mol % $Li_2O$; from 0 mol % to about 5 mol % $K_2O$; at least about 0.1 mol % MgO, ZnO, or combinations thereof, wherein $0 \leq MgO \leq 6$ and $0 \leq ZnO \leq 6$ mol %; and, optionally, at least one of CaO, BaO, and SrO, wherein 0 mol % $\leq CaO + SrO + BaO \leq 2$ mol %.

11. The glass of claim 1, wherein the glass is down-drawable.

12. A method of making an antimicrobial glass, the method comprising:
 a. ion exchanging potassium cations from a first ion exchange bath for sodium cations in a glass to form a compressive layer extending from a surface of the glass to a depth of layer within the glass, the glass comprising from about 50 mol % to about 80 mol % $SiO_2$; from about 5 mol % to about 25 mol % $Al_2O_3$; up to about 15 mol % $B_2O_3$; from about 10 mol % to about 25 mol % $Na_2O$; up to about 5 mol % $K_2O$; from 0.1 mol % to about 2.5 mol % $Li_2O$; up to about 5 mol % $P_2O_5$, up to about 10 mol % MgO; up to about 10 mol % CaO; and up to about 10 mol % ZnO; and wherein 10 mol % $\leq Li_2O + Na_2O - K_2O \leq 30$ mol %; and
 b. ion exchanging silver cations from a second ion exchange bath for lithium cations in a first region within the compressive layer, the first region extending from the surface to a first depth within the glass, the first depth being less than the depth of layer wherein the silver cations provide the glass with antimicrobial activity.

13. The method of claim 12, wherein the compressive layer formed by ion exchanging potassium ions for sodium ions has a first maximum compressive stress, wherein the compressive layer after ion exchanging silver cations for lithium cations has a second maximum compressive stress, and wherein the second maximum compressive stress is at least 80% of the first maximum compressive stress.

14. The method of claim 12, wherein the second maximum compressive stress is at least 700 MPa.

15. The method of claim 12, wherein the first region comprises from about 10 mol % to about 30 mol % $Ag_2O$.

16. The method claim 12, wherein the first depth is less than or equal to about 20 μm.

17. The method of claim 12, wherein the first ion exchange bath comprises at least 90 wt% of at least one potassium salt.

18. The method of claim 12, wherein the second ion exchange bath comprises at least about 5 wt% of at least one silver salt.

19. The method of claim 12, wherein the glass comprises: from about 50 mol % to about 80 mol % $SiO_2$, from about 9 mol % to about 22 mol % $Al_2O_3$; from about 3 mol % to about 10 mol % $B_2O_3$; from about 10 mol % to about 20 mol % $Na_2O$; from 0.1 mol % to about 1.5 mol % $Li_2O$; from 0 mol % to about 5 mol % $K_2O$; at least about 0.1 mol % MgO, ZnO, or combinations thereof, wherein $0 \leq MgO \leq 6$ and $0 \leq ZnO \leq 6$ mol %; and, optionally, at least one of CaO, BaO, and SrO, wherein 0 mol % $\leq CaO + SrO + BaO \leq 2$ mol %.

20. The method of claim 12, wherein the glass has a liquidus temperature of less than about 1100° C.

* * * * *